(12) United States Patent
Park et al.

(10) Patent No.: US 10,018,874 B2
(45) Date of Patent: Jul. 10, 2018

(54) ALIGNMENT FILM FOR LIQUID CRYSTAL LENS AND MOLD FOR PREPARING THE SAME

(71) Applicant: LG CHEM, LTD., Seoul (KR)

(72) Inventors: Jeong Ho Park, Daejeon (KR); Bu Gon Shin, Daejeon (KR); Jae Jin Kim, Daejeon (KR); Jong Byung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 441 days.

(21) Appl. No.: 14/646,351

(22) PCT Filed: Aug. 1, 2014

(86) PCT No.: PCT/KR2014/007146
§ 371 (c)(1),
(2) Date: May 20, 2015

(87) PCT Pub. No.: WO2015/016685
PCT Pub. Date: Feb. 5, 2015

(65) Prior Publication Data
US 2015/0309370 A1    Oct. 29, 2015

(30) Foreign Application Priority Data

Aug. 1, 2013 (KR) .................. 10-2013-0091799
Aug. 1, 2013 (KR) .................. 10-2013-0091800

(51) Int. Cl.
*G02F 1/1337* (2006.01)
*B29C 33/42* (2006.01)
(Continued)

(52) U.S. Cl.
CPC ........ *G02F 1/133707* (2013.01); *B29C 33/42* (2013.01); *B29C 59/04* (2013.01);
(Continued)

(58) Field of Classification Search
CPC ........ G02F 1/133707; G02F 1/133711; G02F 1/13378; G02F 1/133784; B29C 59/04;
(Continued)

(56) References Cited

U.S. PATENT DOCUMENTS 5,438,421 A    8/1995 Sugawara et al.

FOREIGN PATENT DOCUMENTS

CN    1956829 A    5/2007
CN    101592746 A   12/2009
(Continued)

*Primary Examiner* — Ruiyun Zhang
(74) *Attorney, Agent, or Firm* — Dentons US LLP

(57) ABSTRACT

Provided are an alignment film for a liquid crystal (LC) lens, a mold for preparing the same, a method of manufacturing the alignment film, and a method of manufacturing the mold. An alignment film in which an LC lens in which liquid crystals are well aligned, can be effectively manufactured, or a mold for preparing the alignment film can be provided. In particular, in order to implement a shape of a lens, the liquid crystals filled in a nonplanar space, such as a curved surface, are effectively aligned in the LC lens so that the LC lens can be formed. Also, a combined fine pattern can be manufactured using a simple process and can also be applied to a continuous process, such as a roll-to-roll process.

22 Claims, 7 Drawing Sheets

(51) Int. Cl.
*B29C 59/04* (2006.01)
*G02F 1/29* (2006.01)
*B29C 59/02* (2006.01)

(52) U.S. Cl.
CPC .... *G02F 1/13378* (2013.01); *G02F 1/133784* (2013.01); *G02F 1/29* (2013.01); *B29C 2059/023* (2013.01)

(58) Field of Classification Search
CPC . B29C 33/42; B29C 33/424; B29C 2033/426; B29C 2059/023
USPC .......... 428/1.1, 1.2; 427/466, 468; 349/123, 349/124; 264/1.1, 1.33, 1.35, 2.2, 2.7; 425/385
See application file for complete search history.

(56) References Cited

FOREIGN PATENT DOCUMENTS

| | | | |
|---|---|---|---|
| JP | 64-055521 A | | 3/1989 |
| JP | 2011-034062 A | | 2/2011 |
| JP | 2012-242511 A | | 12/2012 |
| JP | 2012242511 | * | 12/2012 |
| JP | 2013-063661 A | | 4/2013 |
| JP | 2013-140306 A | | 7/2013 |
| KR | 10-2009-0112195 A | | 10/2009 |
| KR | 10-2010-0121793 A | | 11/2010 |
| KR | 10-1275520 B1 | | 6/2013 |

* cited by examiner

ALIGNMENT FILM FOR LIQUID CRYSTAL
LENS AND MOLD FOR PREPARING THE
SAME

This application is a National Stage Entry of International Application No. PCT/KR2014/007146, filed Aug. 1, 2014, and claims the priority to and benefit of Korean Patent Application Nos. 10-2013-0091800, filed on Aug. 1, 2013 and 10-2013-0091799 filed on Aug. 1, 2013, all of which are hereby incorporated by reference in their entirety for all purposes as if fully set forth herein.

BACKGROUND

1. Field of the Invention

The present invention relates to an alignment film for a liquid crystal (LC) lens, a mold for preparing the same, a method of manufacturing the alignment film for the LC lens, and a method of manufacturing the mold.

2. Discussion of Related Art

Liquid crystal (LC) lenses may be used in various fields, for example, in three-dimensional (3D) display apparatuses. As liquid crystal technologies have been constantly developed, liquid crystal materials are widely used in a variety of applications in diverse fields.

For example, traditional optical zoom lens groups can achieve the zooming effect only when at least two lenses are coupled to each other and are moved. In an actual application procedure, these optical zoom lens groups are relatively thick and heavy and have large volumes such that it is very inconvenient for a user to use them.

LC lenses are an optical assembly in which light beams are focused or emitted using birefringence characteristics of liquid crystal (LC) molecules and a characteristic arranged according to a change in distributions of electric fields. The LC lenses vary an operating voltage to change an arrangement direction of the LC molecules, thereby realizing the effect of adjusting a focal length. In addition, when LC lenses that are fixedly aligned in a particular direction and liquid crystal cells using an additional voltage driving method are combined with each other, it is easy to implement a display apparatus that may perform two-dimensional (2D)-3D switching in one display depending on whether the liquid crystal cells are driven or not. Characteristics of LC lenses that are light-weight and thin are a big advantage and may allow the LC lenses to effectively achieve the optical zooming effect in a small space.

SUMMARY OF THE INVENTION

The present invention is directed to an alignment film for a liquid crystal (LC) lens, a mold for preparing the same, a method of manufacturing the alignment film for the LC lens, and a method of manufacturing the mold, and more particularly, to an alignment film for an LC lens in which a fine pattern is capable of being easily formed on a surface of a base material having a nonplanar shape, a curved surface shape, or a three-dimensional (3D) shape by using a simple process and a mold for preparing the alignment film for the LC lens.

Hereinafter, embodiments of the present invention will be described in greater detail with reference to the accompanying drawings. In the description of the present invention, detailed explanations of a well-known general-purpose function or configuration of the related art are omitted. Also, the accompanying drawings are schematic diagrams for understanding the present invention, and in order to clearly describe the present invention, unrelated portions to the explanations are omitted, and the scope of the present invention is not limited by the drawings.

The present invention is directed to an alignment film for a liquid crystal (LC) lens and a mold for preparing the same. The term [mold for preparing the alignment film for an LC lens] is a mold 100 configured to prepare an alignment film 200 for an LC lens, including: at least one nonplanar surface 201 formed so that liquid crystals injected as the alignment film 200 for the LC lens can be maintained in the form of a lens; and bumps 202 that are formed on the at least one nonplanar surface 201 and have a dimension that may represent liquid crystal alignment performance. The bumps 202 may be formed to represent liquid crystal alignment performance so that the liquid crystal maintained in the form of the lens can be aligned.

The mold for preparing the alignment film 200 for the LC lens may have a replicated pattern including bumps 102 that are formed on one or more nonplanar surfaces or curved surfaces 101, for example, and have a dimension that may represent liquid crystal alignment performance. The one or more nonplanar surfaces 101 may be curved surfaces so as to form the LC lens or may have a shape of a lens. Specific embodiments of the one or more nonplanar surfaces 101 are not particularly limited and may be selected in consideration of the shape of a lens to be formed. For example, the one or more nonplanar surfaces 101 may have a shape of a lenticular lens. The lenticular lens is an array of magnifying lenses having a semicylindric shape, designed so that when viewed from slightly different angles, different images are magnified. Thus, the one or more nonplanar surfaces 101 may have a shape in which the shape of the lens extends in one direction. FIG. 1 illustrates an exemplary shape of the mold 100, i.e., a shape of a replicated pattern including one or more nonplanar surfaces 101 and bumps 102 formed on surfaces of the one or more nonplanar surfaces 101. Also, FIG. 2 illustrates an exemplary shape of the alignment film 200, i.e., a shape of a liquid crystal alignment pattern that represents one or more nonplanar surfaces 201 having a shape in which one or more nonplanar surfaces 101 of the mold 100 are transcribed and that includes bumps 202 that are formed when the replicated pattern including the bumps 102 of the mold 100 is imprinted and have a dimension that may represent liquid crystal alignment performance. Thus, the bumps 202 of the alignment film 200 correspond to grooves 103 between the bumps 102 of the mold 100.

In detail, a mold for preparing the alignment film for the LC lens according to an exemplary embodiment of the present invention may have a replicated pattern including bumps 102 that are formed on one or more nonplanar surfaces 101 and have a dimension that may represent liquid crystal alignment performance, as described above. In a specific example of the present invention, the alignment film 200 for the LC lens in which the one or more nonplanar surfaces 101 and the bumps 102 on the one or more nonplanar surfaces 101 are imprinted to correspond to each other, may be manufactured by using the mold. In the alignment film 200 for the LC lens, injected liquid crystals are maintained in the form of a lens, and the injected liquid crystals can be aligned, as described above. A fine pattern can be easily formed on a surface of a base material having a curved surface shape or a three-dimensional (3D) shape by using the mold and by performing a simple process. In this way, when bumps having a dimension that may represent liquid crystal alignment performance are formed on the one or more nonplanar surfaces 101, in order to effectively induce the physical confinement effect on an alignment direction of LC molecules, in consideration of the size of the LC molecules even though an interaction between the LC molecules is large, the size of the bumps 102 may be decreased to be advantageous to acquisition of excellent alignment performance, because, as the size of the bumps 102 is decreased, a constraint force that affects alignment of the LC molecules is increased. Thus, the size of the bumps 102 may be controlled to the size of several tens to several hundreds of nanometers. It is difficult to implement a pattern having an ultra-fine critical dimension (CD) and a period on one or more nonplanar surfaces even using a conventional lithography technology or an electron beam lithography technology based on an existing high-cost semiconductor process, and it may be very difficult to implement large-scaling up that needs to be applied to a display application, by using such a process.

The shape of a lens formed by one or more nonplanar surfaces 101 of the mold 100 or one or more nonplanar surfaces 201 of the alignment film 200 may have a shape of a lenticular lens array that extends in one direction, and the shape of the lens in the array is not particularly limited. For example, the lens may have a well-known shape, such as a shape of the lenticular lens array configured of a convex lens shape, a concave lens shape, or a Fresnel lens shape. FIG. 6 illustrates a cross-sectional shape of a lenticular lens array based on a convex lens that may be formed by the one or more nonplanar surfaces 201 of the alignment film 200, and FIG. 7 illustrates a cross-sectional shape of a lenticular lens array based on a Fresnel lens that may be formed by the one or more nonplanar surfaces 201 of the alignment film 200. When the LC lens is implemented in the form of a Fresnel lens (not in the form of a grade refractive index (GRIN) lens), a desired focal length can be obtained by using a relatively thin LC layer.

The size of the bumps 102 of the mold, for example, the range of a width W, a height H, or a pitch P of the bumps 102 illustrated in FIG. 1 is not particularly limited and may be any range in which a pattern in which the bumps 102 of the mold may represent liquid crystal alignment performance, can be imprinted. For example, the width of the bumps 102 of the mold may be 0.05 µm to 10 µm, 0.1 µm to 8 µm, 0.15 µm to 6 µm, 0.2 µm to 4 µm, 0.25 µm to 2 µm, or 0.3 µm to 1 µm, and the pitch P of the bumps 102 of the mold may be 0.05 µm to 20 µm, 0.2 µm to 16 µm, 0.3 µm to 12 µm, 0.4 µm to 8 µm, 0.5 µm to 4 µm, or 0.4 µm to 2 µm. Also, the height or depth of the bumps 102 of the mold may be 0.01 µm to 5 µm, 0.05 µm to 4.8 µm, 0.1 µm to 4.5 µm, 0.15 µm to 4.3 µm, 0.2 µm to 4 µm, 0.3 µm to 4 µm, or 0.5 µm to 4 µm. As the bumps 102 formed to be adjusted to a size in the above-described range are imprinted onto the above-described alignment film, the alignment film may represent appropriate liquid crystal alignment performance.

In one embodiment, the one or more nonplanar surfaces 101 of the mold may have a shape of a lens that extends in one direction, as illustrated in FIG. 4. Also, the bumps 102 of the mold may be formed in the form of a line that constitutes an angle within the range of 0° to 90° with respect to the extension direction of the lens shape, as illustrated in FIG. 4. Thus, the one or more nonplanar surfaces 201 of the alignment film 200 may also have a shape of a lens that extends in one direction. Also, the bumps 202 of the alignment film 200 may be formed in the form of a line that constitutes an angle within the range of 0° to 90° with respect to the extension direction of the lens shape.

As illustrated in FIG. 5, the mold 100 may have a shape of a roll 501. That is, the mold 100 may be formed in the form of the roll 501 in which the one or more nonplanar surfaces 101 exist outside the roll 501, as illustrated in FIG. 5. In this case, one or more convex portions may be formed in the form of a line on the roll 501. It is difficult to manufacture a fine pattern by using a curved surface-shaped or 3D-shaped patterning technology, because the curved surface-shaped or 3D-shaped patterning technology is a extremely complicated process. However, by using the mold 100 according to the present invention, a combined fine pattern can be formed using an easy process and can also be applied to a continuous process, such as a roll-to-roll process 500. Thus, a level of difficulty of a process can be lowered and thus, the combined fine pattern can be easily applied to the process.

The alignment film 200 for the LC according to a specific embodiment of the present invention includes a liquid crystal alignment pattern including the bumps 202 that are formed on one or more nonplanar surfaces 201 and have a dimension that may represent liquid crystal alignment performance, for example, as illustrated in FIG. 2. In one embodiment, the one or more nonplanar surfaces 201 of the alignment film 200 may have a shape of a concave portion that extends in one direction.

The shape or size of the one or more nonplanar surfaces 201 and/or the bumps 202 of the alignment film 200 is not particularly limited, and the one or more nonplanar surfaces 201 of the alignment film 200 may have a shape in which the one or more nonplanar surfaces 101 of the above-described mold are imprinted. Similarly, the bumps 202 of the alignment film 200 may have a shape in which the one or more nonplanar surfaces 101 are imprinted by the bumps 102 and the grooves 103 of the above-described mold.

The range of a width W, a height H, or a pitch P of the bumps 202 of the alignment film 200 is not particularly limited and may be in any range in which the bumps 202 of the alignment film 200 may represent liquid crystal alignment performance. For example, the width W of the bumps 202 of the alignment film 200 may be 0.5 µm to 10 µm, and the pitch P of the bumps 202 of the alignment film 200 may be 0.5 µm to 20 µm. Also, the height H or depth of the bumps 202 of the alignment film 200 may be 0.01 µm to 5 µm. The bumps 202 formed to be adjusted to a size within the above-described range may represent appropriate liquid crystal alignment performance.

As described above, a liquid crystal (LC) film having a shape of a LC lens can be manufactured using the mold and the alignment film according to the present invention, and the LC film can be used to implement an auto-stereoscopic 3D image apparatus.

The present invention is also directed to a method of manufacturing the alignment film or the mold. In one embodiment, the alignment film may be manufactured by forming a liquid crystal alignment pattern by patterning the replicated pattern of the above-described mold onto an object to be imprinted. In one embodiment, the alignment film can be manufactured by a roll-to-roll process using a mold having a shape of the roll 501, as illustrated in FIG. 5.

In another embodiment, FIG. 3 illustrates a method of manufacturing the alignment film for the LC lens according to an exemplary embodiment of the present invention. As illustrated in FIG. 3, the method of manufacturing includes forming a pattern including the bumps 202 having a dimension that may represent liquid crystal alignment performance on a layer 302 to be imprinted, on a planar surface and forming a surface of the layer 302 to be imprinted, on which the pattern is formed, as a nonplanar surface 201. The nonplanar surface 201 of the alignment film may be the nonplanar surface 201 that constitutes a shape of a lens.

Also, forming the surface of the layer 302 to be imprinted, as the nonplanar surface 201 may be performed so that the shape of the bumps 202 can be maintained on the surface of the nonplanar surface 201. When the alignment film is formed using the method of manufacturing, a fine pattern having a curved surface shape with a high curvature radius and having a complicated 3D shape with high reliability can be formed. Forming the bumps 202 and/or forming the nonplanar surface 201 may be performed using a well-known method in the art and may be performed using a hot embossing process or a nanoimprint process, for example. However, embodiments of the present invention are not limited thereto.

The term [hot embossing] used herein is a process of reproducing a shape by applying a predetermined pressure and heating on a layer to be imprinted, using a mold in which a desired shape is imprinted. In one embodiment, the layer to be imprinted may be a thermoplastic resin, and the thermoplastic resin shows a flow movement of a fluid having viscosity as temperature rises up. In this case, when the layer to be imprinted is compressed using a mold in which an intagliated or embossed particular shape is imprinted, an empty space of the shape is filled with a plastic fluid, and then, the mold is removed so that the shape can be replicated.

A material used to form the layer 302 to be imprinted on the planar surface may be any material that may be used to form a shape using a hot embossing process, for example, and is not particularly limited. If the material used to form the layer 302 to be imprinted is any polymer material having an excellent thermal processability property in which an ultra-fine uneven structure shape having high reliability can be easily imprinted, thermal decomposition does not occur in the hot embossing process, and an undesired subreaction does not intervene in other thermal formation processes, in the formation of the bumps 202 having a dimension that may represent liquid crystal alignment performance through the hot embossing process, the material used to form the layer 302 to be imprinted is not particularly limited. Furthermore, when a support layer 303 that will be described below is formed, a material used to form the support layer 303 may be a material having no solubility in a solution coating process using the material used to form the support layer 303. In one embodiment, the layer 302 to be imprinted on the planar surface may include thermoplastic polymer. For example, the layer 302 to be imprinted may include one or more materials selected from the group consisting of polymethyl methacrylate (PMMA), ethylene vinyl acetate (EVA), polyethylene terephthalate (PET), polyamide (PA), cyclo olefin polymer (COP), cyclo olefin copolymer (COC), polyvinyl chloride (PVC), polyethylene naphthalate (PEN), polycarbonate (PC), polyethersulfone (PES), polybutylene terephthalate (PBT), acrylonitrile butadiene styrene (ABS), polyacetal (POM), polyetherimide (PEI), polyphenylsulfone (PPSU), polyamideimide (PAI), and polypropylene (PP).

In one embodiment, the method of manufacturing the alignment film 200 according to the present invention may include forming a support layer 303 on a pattern before the surface of the layer 302 to be imprinted is formed as a nonplanar surface 201. That is, when the bumps 202 of the alignment film 200 are firstly formed and then the nonplanar surface 201 is formed by embossing, the physical structure of the bumps 202 that have been already formed may not be maintained by heat applied when the nonplanar surface 201 is formed. In order to prevent this problem, the support layer 303 may be formed on the pattern that has been already formed, before the embossing process is performed, i.e., the nonplanar surface 201 is formed.

A specific formation method or material for the support layer 303 is not particularly limited as long as the support layer 303 is formed to maintain the shape of the pattern including the bumps 202 in the embossing process. For example, the support layer 303 may be formed by using a solution coating method using a polymer solution, a nanoparticle dispersion solution, or a metal oxide derivative, or a sputtering or a deposition method, such as dry deposition method, for example, chemical vapor deposition (CVD) or physical vapor deposition (PVD). Also, a material for the support layer 303 may be any material that may maintain the shape of the pattern including the bumps 202 in the embossing process and may be selectively removed as needed later. In one embodiment, the support layer 303 may include one or more materials selected from the group consisting of polyvinylalcohol (PVA), polyvinylpyrrollidone (PVP), polyethylene oxide (PEO), polyacrylamide (PAAM), polyeacrylic acid, polystyrenesulfonic acid (PSSA), polysilicic acid (PSiA), polyphosphoric acid (PPA), polyethylene sulfonic acid (PESA), polyethyleneimine (PEI), polyamideamine (PAMAM), and polyamine. The support layer 303 may be formed by coating of the above-described water-soluble polymer solution or polymer nanoparticle solution, and as occasions demand, the support layer 303 may be coated using a sol-gel type metal oxide precursor based on hydrolysis in which a solution process can be performed, or condensation reaction, a metal oxide nanoparticle solution, or a mixture thereof. For example, the support layer 303 may include one or more material selected from the group consisting of titanium alkoxide, zircodium alkoxide, tungsten alkoxide, tin alkoxide, zinc alkoxide, aluminum alkoxide, cesium alkoxide, iridium alkoxide, and silicon alkoxide.

For example, the support layer 303 may be formed by wet coating or drydeposition. However, embodiments of the present invention are not limited thereto.

In detail, an operation of forming the support layer 303 may be performed using one or more methods selected from the group consisting of spin coating, roll coating, deep coating, spray coating, dip coating, flow coating, bar coating, doctor blade, dispensing, and thin film laminating.

In one embodiment, the dry deposition method may be performed by one selected from the group consisting of CVD, plasma sputtering, evaporation, and atomic layer deposition (ALD).

The method of manufacturing the alignment film 200 according to an embodiment of the present invention may further include removing the support layer 303 from the pattern after the surface of the layer 302 to be imprinted is formed as the nonplanar surface 201. An operation of removing the support layer 303 may be performed using a material that has etching with respect to the support layer 303 and has no etching with respect to the layer 302 to be imprinted. For example, it is easy to selectively remove the above-described water-soluble polymer, such as PVA or PVP, using water or an alcoholic solution, such as isopropyl alcohol (IPA). Meanwhile, the above-described sol-gel type metal oxide may be removed using a diluted acidic aqueous solution, and in detail, the sol-gel type metal oxide may be selectively removed using a 1% HCl aqueous solution. However, embodiments of the present invention are not limited thereof. The support layer 303 may maintain the pattern including the bumps 202 during hot embossing, as described above, and after the nonplanar surface 201 has been formed, the support layer 303 may be removed so that the bumps 202 can be formed on the nonplanar surface 201.

The present invention is also directed to a method of manufacturing a mold 100 for preparing the alignment film 200 for the LC lens. In one embodiment, the mold 100 may be formed by modeling on the alignment film 200 manufactured by the above-described method. The method of manufacturing the mold 100 may include forming a pattern including bumps that have a dimension that may represent liquid crystal alignment performance on a layer to be imprinted on a planar surface, and after a surface of the layer to be imprinted having the pattern formed thereon is formed as a nonplanar surface, patterning a shape of the nonplanar surface onto an object to be imprinted. The mold 100 may be a mold 100 including one or more nonplanar surfaces 101 that may have the shape of a lens and one or more bumps 102 that are formed on surfaces of the one or more nonplanar surfaces 101 and may constitute grooves 103 having liquid crystal alignment performance.

The present invention is also directed to a method of manufacturing an LC film using the above-described alignment film. The method of manufacturing the LC film according to an exemplary embodiment of the present invention may include forming an LC layer by injecting LC materials into nonplanar surfaces of the above-described alignment film. Also, the method of manufacturing may include forming an alignment layer so as to seal the LC materials on the LC layer. Meanwhile, the alignment layer may be manufactured using a well-known material in the art and may be formed by a rubbing alignment process or an photo-irradiating alignment process using linear polarized light, for example. Also, the alignment layer may be any alignment layer that may represent liquid crystal alignment performance and is not particularly limited, and a well-known alignment layer may be used as the alignment layer. In one embodiment, the alignment layer may be formed such that an alignment direction that represents liquid crystal alignment performance corresponds to an alignment direction of bumps of an LC layer disposed below the alignment layer. The bumps of the LC layer may be bumps that are formed of LC materials by the bumps or grooves of the alignment film by injecting the LC materials into the above-described alignment film. Also, the injected LC materials may be used to finally form the LC layer through a curing process. The curing process may be performed by a well-known method, for example, an ultraviolet radiation or thermal curing process. In one embodiment, the alignment layer may be stacked on an opposite surface to a surface on which bumps of the LC layer are formed, so as to align liquid crystals. That is, liquid crystal alignment is well performed at a region of a thick LC layer that is close to the surface on which the bumps are formed, and alignment is not property working on an opposite surface to the surface on which the bumps are formed. Thus, LC molecules formed on the opposite surface may be aligned. Thus, uniform liquid crystal alignment may be induced in the entire region of a lens filled with liquid crystals.

Effects

As described above, the present invention can provide an alignment film for a liquid crystal (LC) lens in which liquid crystals are well aligned, is capable of being effectively manufactured and a mold for preparing the alignment film for the LC lens. In particular, according to the present invention, in order to implement a shape of a lens, the liquid crystals filled in a nonplanar space, such as a curved surface, are effectively aligned in the LC lens so that the LC lens can be formed.

EXPLANATION OF THE MARKS IN THE FIGURES

Figure 1:
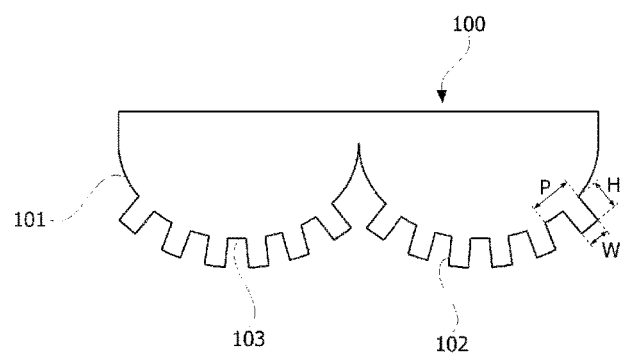
FIG. 1 is a cross-sectional view of a mold according to an exemplary embodiment of the present invention.
Figure 2:
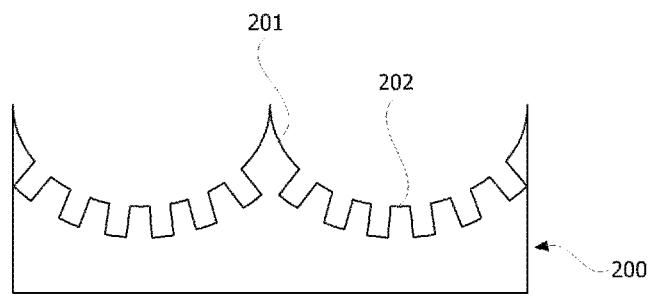
FIG. 2 is a cross-sectional view of an alignment film according to an exemplary embodiment of the present invention.

100: mold 101: nonplanar surfaces (lens-shape)
102: bumps of mold
103: grooves
200: alignment film
201: nonplanar surfaces (lens-shape)
202: bumps of alignment film
301: protective film
302: layer to be imprinted on a planar surface
303: support layer
304: liquid crystal materials
500: roll-to-roll process
501: roll

DETAILED DESCRIPTION OF EXEMPLARY EMBODIMENTS

Hereinafter, Examples of the present invention and Comparative example that does not comply with the present invention will be described in more detail. However, the scope of the present invention is not limited to the following suggested Examples.

Example 1

A linear line grating having a pitch of 8 µm, a width of 2 µm, and a height of 3.5 µm was formed in quartz substrate using a photolithography process and a dry etching process, and a pattern master mold having a pitch of 8 µm, a width of 2 μm, and a height of 2.5 μm was manufactured using a dry etching process on the condition of 2 mTorr, $C_4F_8$=30 sccm, and ICP:RF=1000:50 W. Subsequently, a fluorinated silane (OPTOOL™, Daikin Industries, Ltd.) solution that was diluted with 1 wt % was coated on the quartz material by spin coating, was dried at 120° C. for 30 minutes and was released, and polyurethane acrylate (PUV) for ultraviolet curing (SRMO4, Minuta Technology Co., Ltd.) was coated on a surface of a pattern by spin coating (500 rpm, 30 seconds) and then, a PET base material having a thickness of 180 μm was added to a resultant material so that curing and releasing were performed by ultraviolet radiation (100 W/cm$^{-2}$, 120 seconds) and thus the pattern was reproduced and a mold was manufactured.

Figure 3:
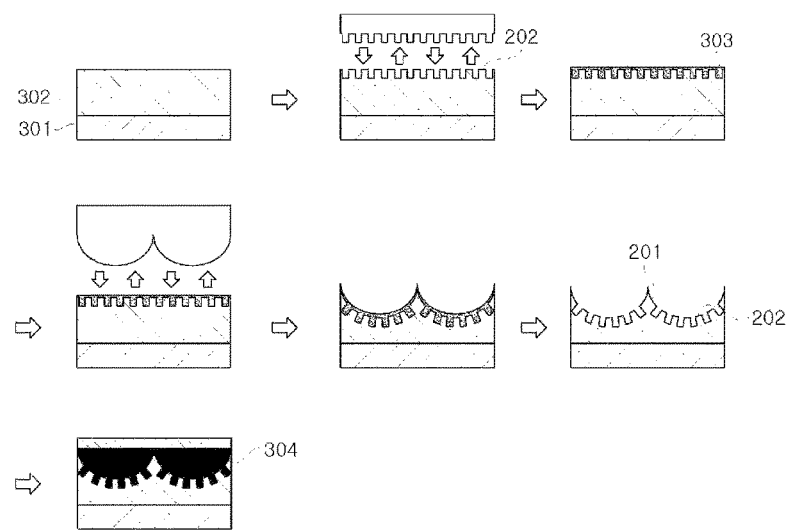
FIG. 3 is a cross-sectional view illustrating a method of manufacturing an alignment film according to an exemplary embodiment of the present invention.
Figure 4:
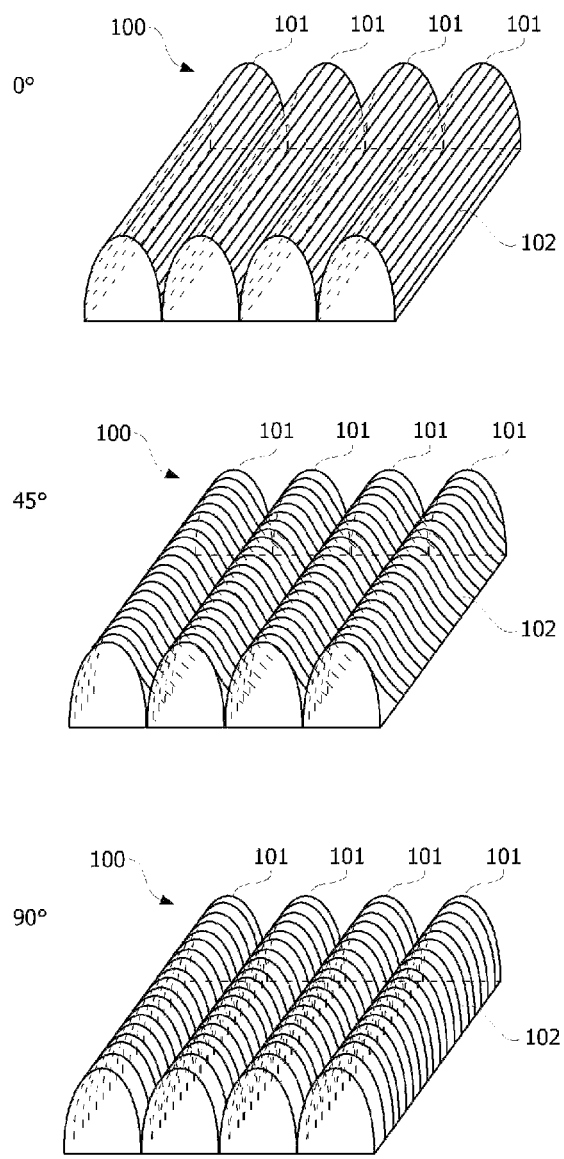
FIG. 4 is a perspective view of a mold according to an exemplary embodiment of the present invention.
Figure 5:
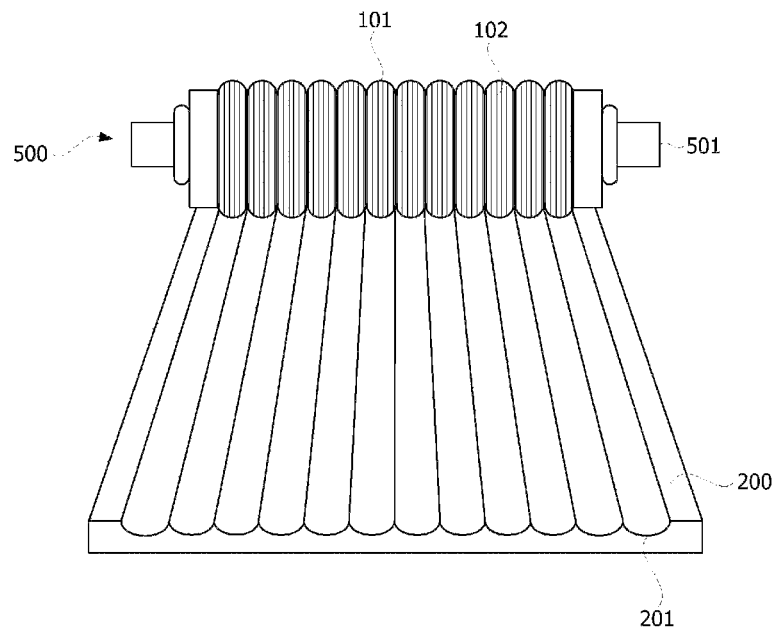
FIG. 5 is a perspective view illustrating a roll-to-roll process according to an exemplary embodiment of the present invention.
Figure 6:
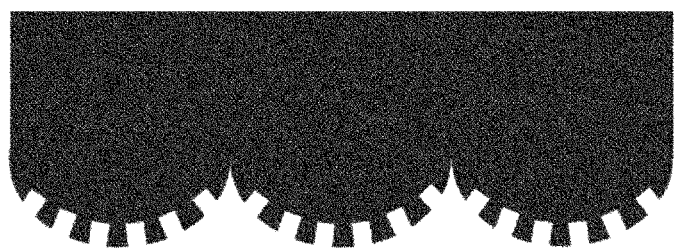
FIG. 6 is a cross-sectional view of a lenticular lens array based on a convex lens according to an exemplary embodiment of the present invention.
Figure 7:
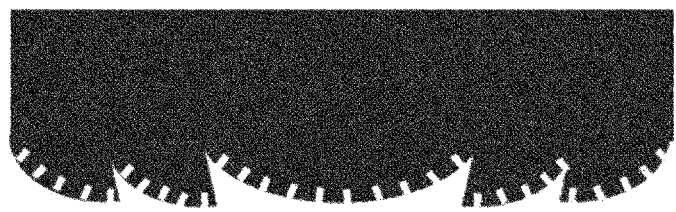
FIG. 7 is a cross-sectional view of a lenticular lens array based on a Fresnel lens according to an exemplary embodiment of the present invention.

The mold was used to form a pattern having bumps 202 that have a dimension that may represent liquid crystal alignment performance. That is, an alignment film for an LC lens was manufactured by the method illustrated in FIG. 3. First, a layer 302 to be imprinted was formed using a PMMA film having a thickness of about 180 μm, and subsequently, a pattern including the bumps 202 was formed on the layer 302 to be imprinted, by using the above-described mold (having a pitch of about 8 μm, a height of about 2.5 μm, and a width of about 2 μm) by a hot embossing process. Subsequently, a support layer 303 was formed on the pattern. The support layer 303 was prepared by forming a titanium dioxide ($TiO_2$) layer on the pattern by using spin coating using well-known sol-gel reactive titanium alkoxide.

The $TiO_2$ sol-gel precursor solution was prepared by mixing 125 mL Ti-isopropoxide that was a precursor of titanium dioxide and 2 mL hydrochloric acid that was a catalyst with 50 mL isopropyl alcohol that was a solvent in a glove box filled with nitrogen and by agitating the mixture for 10 minutes.

Subsequently, the $TiO_2$ sol-gel precursor solution was left along on the condition of room temperature and relative humidity of 65% and was gelled so that titanium oxide (titanium dioxide (TiO2)) could be formed by hydrolysis and condensation reaction through a reaction with moisture in the air.

Figure 8:
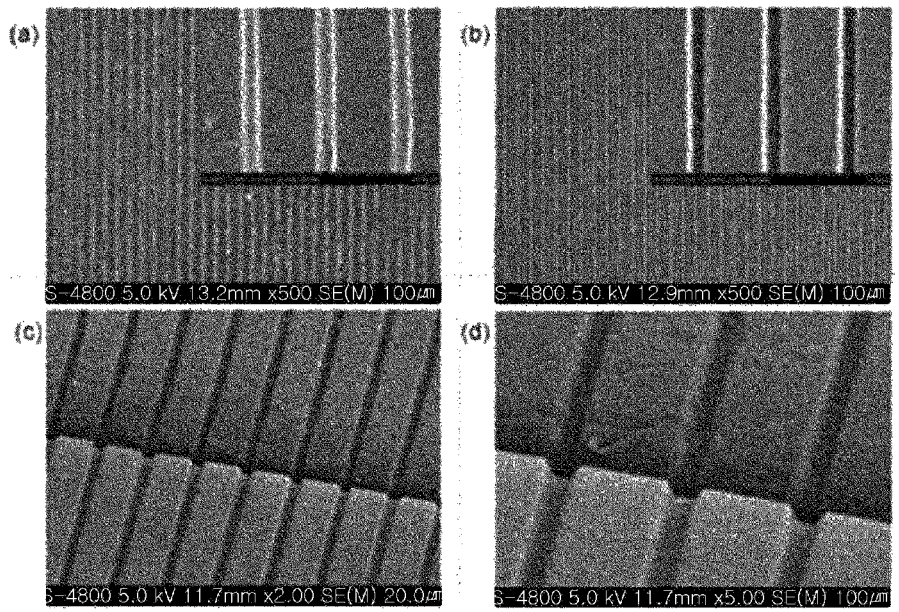
FIGS. 8 through 13 are scanning electron microscope (SEM) images of an alignment film according to Example of the present invention and an alignment film according to Comparative example, respectively.

Subsequently, a secondary hot embossing process was performed on the PMMA film on which the support layer 303 was formed, by molding (machining) of a shape of a lenticular lens. Subsequently, an alignment film for an LC lens was obtained by selectively etching the support layer ($TiO_2$) using an HCl aqueous solution (concentration of hydrochloric acid: 1 wt %). As illustrated in FIG. 8, (a) is a scanning electron microscope (SEM) image in which the sol-gel $TiO_2$ precursor was selectively filled in the bumps 202 and the support layer 303 was formed, and (b) is a SEM image after $TiO_2$ was selectively removed, and (c) and (d) are SEM images in which a fine pattern was well formed even in a steep curvature of the shape of the lens.

Example 2

An alignment film was manufactured by the same method as that of Example 1 except that a hot embossing process was performed by molding (machining) of a shape of a Fresnel lens, instead of a shape of a lenticular lens based on a convex lens in the secondary hot embossing process of Example 1.

Figure 9:
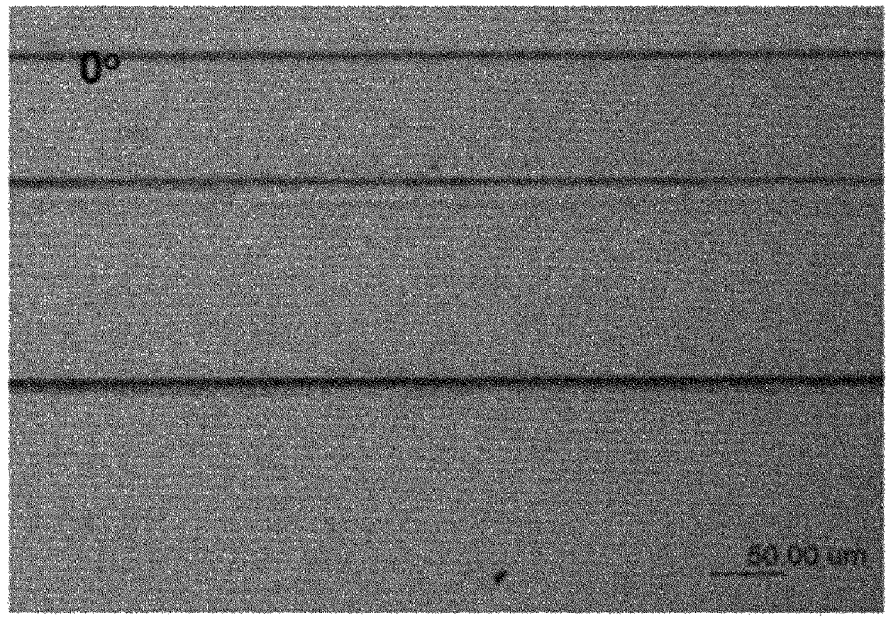
Figure 10:

FIGS. 9 and 10 are SEM images of the alignment film manufactured according to Example 2. It was found from the SEM images that a fine pattern was well formed even in a curve having a steep slope that constitutes a Fresnel lens having a complicated shape.

In detail, FIG. 9 illustrates that a lens axis and a fine linear pattern are aligned parallel to each other when an angle formed by an extension direction in which a linear Fresnel lens shape extends in one direction, and an extension direction of a linear shape of the bumps is 0°. Also, FIG. 10 illustrates an SEM image having a structure in which the lens axis and the fine linear pattern are aligned perpendicular to each other when the angle formed by the extension direction in which the linear Fresnel lens shape extends in one direction and the extension direction of the linear shape of the bumps is 90°.

This means that arrangement of a lens formed according to the mold and/or alignment film according to the present invention and an alignment direction of liquid crystals can be freely controlled.

Referring to FIGS. 8 through 10, metal oxides ($TiO_2$) that are selectively filled in the bumps 202 are not connected to each other and are disconnected through a sol-gel reaction.

This means that a shear flow of polymer of the layer 302 to be imprinted occurs in the entire surface of the layer 302 to be imprinted in a boundary region of the mold as surface formation and surface area of the layer 302 to be imprinted are increased during the secondary embossing process, i.e., a thermal formation process of the lens shape, whereas the metal oxide does not change in its shape due to a thermal formation temperature of the layer 302 to be imprinted.

Example 3

In the method of manufacturing the alignment film according to Example 2, a polyvinylpyrrolidone polymer, instead of a $TiO_2$ sol-gel precursor was used to form the support layer 303.

After a primary embossing process was performed in the same way as Example 2, the polyvinylpyrrolidone polymer was filled in the support layer 303 by spin coating of the polymer solution. In this case, the polyvinylpyrrolidone polymer solution in an amount of 10 to 20 wt % was prepared to be dissolved in isopropyl alcohol. Then, a second embossing process was performed by transcribing a shape of a lens using a mold having a Fresnel lens shape, by immersing the lens shape in water or isopropyl alcohol for about 1 minute, and by selectively removing the polyvinylpyrrolidone polymer that is the support layer 303.

Figure 11:
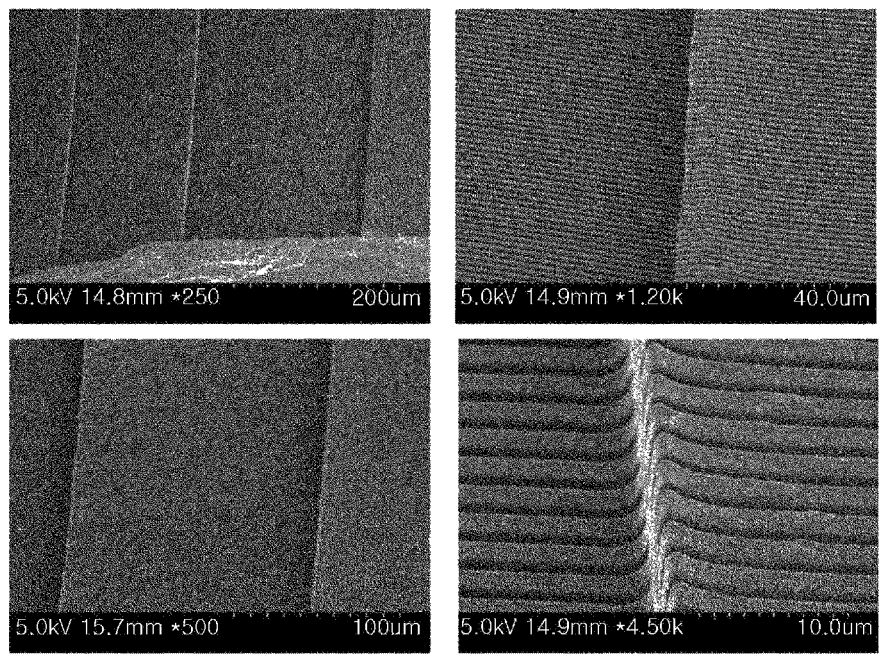
Figure 12:
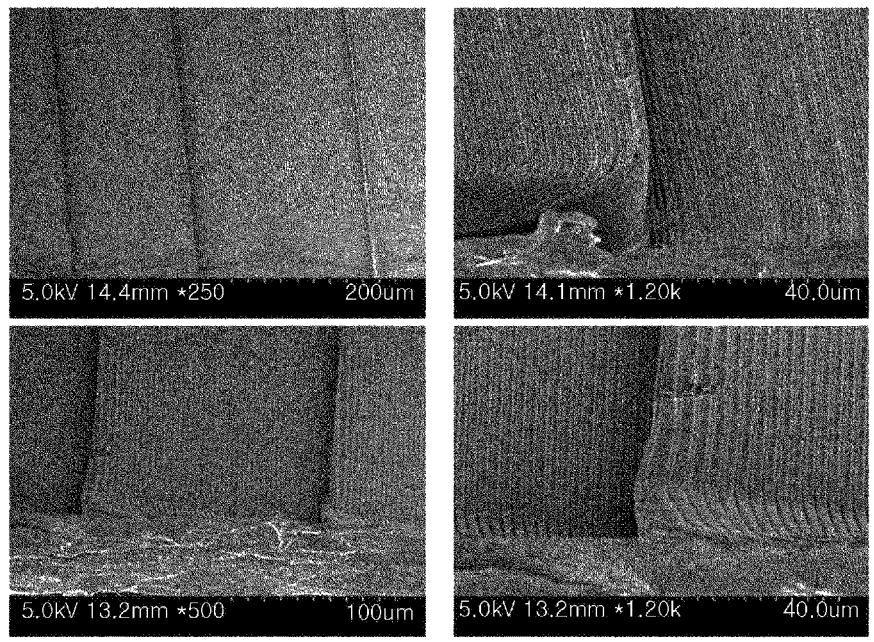

FIGS. 11 and 12 are SEM images of the alignment film manufactured according to Example 3. It is found from the SEM images that a fine pattern is well formed even in a curve of a Fresnel lens having a complicated shape. In detail, FIG. 11 is an SEM image having a structure in which a lens axis and a fine linear pattern are aligned perpendicular to each other when an angle formed by an extension direction in which fine concave portions (grooves) having a linear shape extend in one direction and the lens axis of the Fresnel lens is 90°. Also, FIG. 12 illustrates that the lens axis and the fine linear pattern are aligned parallel to each other when the angle formed by the extension direction in which the fine concave portions (grooves) having a linear shape extend in one direction and the lens axis of the Fresnel lens is 0°.

Also, the TiO2 oxides in Example 3 are not connected to each other and are disconnected. After the fine pattern was maintained by using the polyvinylpyrrolidone polymer as the support layer 303 and the support layer 303 was removed, a continuous linear pattern structure in which no bumps are disconnected, could be obtained. This is a result in which an empty space of the fine pattern is uniformly elongated at the similar ratio as thermal flow of a film of the layer 302 to be imprinted while a specific surface area of the polyvinylpyrrolidone polymer is widened as the polyvinylpyrrolidone polymer is formed as a Fresnel lens unevenness and a curved surface on a planar surface of the pattern in the secondary embossing process.

Example 4

The mold was manufactured by the same method as that of Example 1, wherein a nano-scaled linear grating structure, i.e., a pattern having a width of about 75 nm, a pitch of about 150 nm, and a height of about 150 nm, respectively was used as a master mold, and a shape of the pattern was reproduced, so as to form ultra-fine bumps.

In order to form ultra-fine concave portions, an alignment film was manufactured by the same method as that of Example 3 by using the mold in which the nano linear lattice structure was imprinted.

Figure 13:
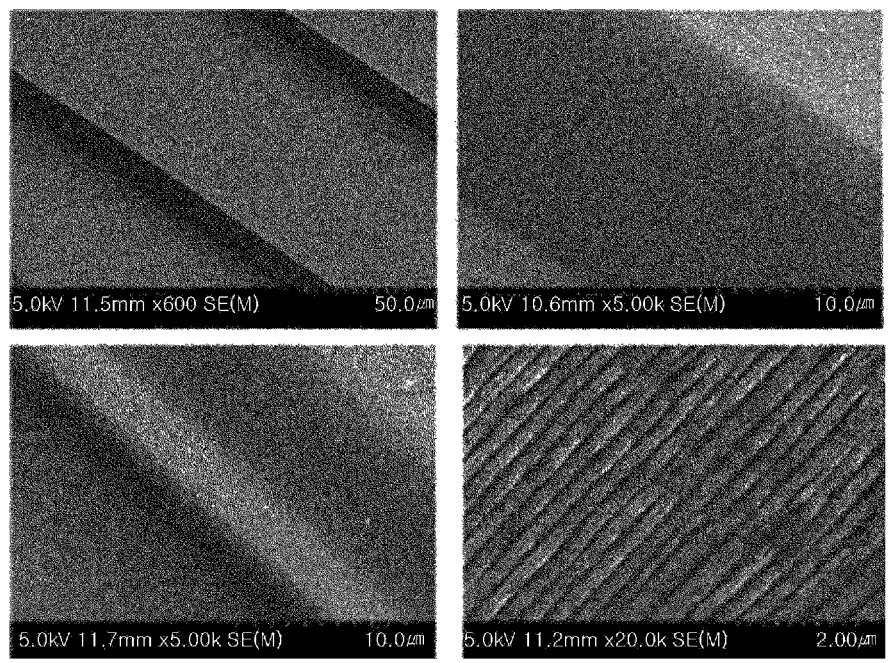

FIG. 13 is an SEM image of an alignment film having a shape of a Fresnel lens that was manufactured using a nano linear lattice having a width of about 0.075 μm, a pitch of about 0.150 μm, and a height of about 0.150 μm. It was found that an angle formed by an alignment direction of the bumps and a lens axis of a lenticular lens array was 45° and nanoscale bumps were uniformly formed on an upper curved surface and an uneven upper portion of the Fresnel lens shape.

Example 5

Figure 14:
FIG. 14 is a photo of the mold according to Example of the present invention.

Copper-cobalt (Cu—Co) was deposited to a thickness of about 0.015 μm on a surface on which bumps for liquid crystal alignment of the alignment film (110 mm×110 mm) manufactured in Example 4, by using vacuum deposition and sputtering, and copper was plated to a thickness of about 800 μm by using electro deposition. Finally, the alignment film was removed, and an electroforming mold in which the fine shape of the alignment film was reproduced, was manufactured by removing the alignment film. FIG. 14 is an image of a mold having a shape of a Fresnel lens array in which bumps for liquid crystal alignment were imprinted.

Example 6

<Liquid Crystal Alignment Test>

A liquid crystal (LC) layer was formed by filling an LC polymer in an upper portion of a concave curved surface on the alignment film manufactured in Example 4, and an LC sheet was manufactured to seal the LC layer with an upper base material. In this case, an alignment layer was introduced into the upper base material in the same direction as a direction of the alignment pattern formed on the LC layer having a lens shape disposed below the alignment layer.

In detail, the alignment layer was manufactured using an optical alignment process. After an upper film having the manufactured optical alignment layer and the LC layer having the lens shape were placed to face each other and were adjusted so that alignment directions were the same, an LC composite (LC242, manufactured by BASF) was coated on a surface of the lenticular lens so that a thickness of the LC composite after being cured was a thickness of the lens and then, the alignment layer that was aligned was laminated on an the LC composite, and ultraviolet rays (500 m J/cm$^2$) were radiated onto a surface of a base material for the alignment layer, thereby forming a film.

Comparative Example 1

Figure 15:
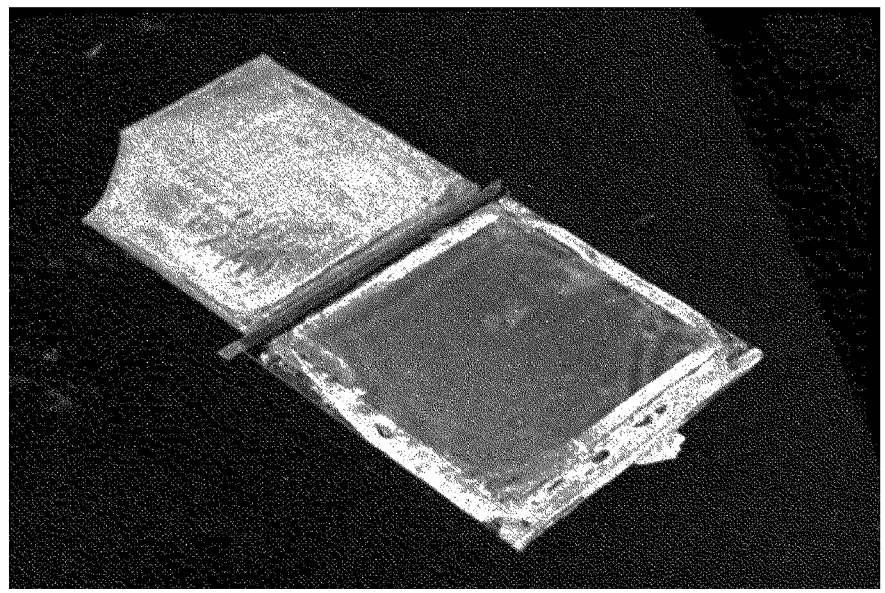
FIG. 15 is a photo of a liquid crystal (LC) film manufactured by an alignment film according to Example of the present invention and according to Comparative example, respectively.

A lens film having no bumps for liquid crystal alignment formed therein was manufactured on a Fresnel lens so that a sample for a liquid crystal alignment test was manufactured in the same process as Example 6. FIG. 15 is a photo in which alignment characteristics of liquid crystal films manufactured according to Example 6 and Comparative example 1, respectively, are identified when the liquid crystal films were placed between two polarizing plates, of which optical axes are perpendicularly aligned each other. That is, FIG. 15 shows a degree of liquid crystal alignment depending on the presence of bumps for liquid crystal alignment formed in a film. A film of a Fresnel lens in which nanoscale bumps are formed, has excellent liquid crystal alignment characteristics.

What is claimed is:

1. A mold for preparing an alignment film for a liquid crystal (LC) lens, the mold comprising a replicated pattern comprising bumps that are formed on one or more nonplanar surfaces and have a dimension that provides liquid crystal alignment,
  wherein the one or more nonplanar surfaces have a shape of a lenticular lens array that extends in one direction.

2. The mold of claim 1, wherein the lenticular lens array is configured of a convex lens shape, a concave lens shape, or a Fresnel lens shape.

3. The mold of claim 1, wherein a width of each of the bumps is 0.05 μM to 10 μM.

4. The mold of claim 1, wherein a pitch of each of the bumps is 0.05 μM to 20 μM.

5. The mold of claim 1, wherein a height of each of the bumps is 0.01 μM to 5 μM.

6. The mold of claim 1, wherein the bumps has a linear shape in which an angle formed by the extension direction of the shape of the lenticular lens array and an extension direction of the linear shape of the bumps is 0° to 90°.

7. The mold of claim 1, wherein the one or more nonplanar surfaces are in a form of a roll in which the one or more nonplanar surfaces exist outside the roll.

8. An alignment film for a liquid crystal (LC) lens having a liquid crystal alignment pattern formed in the alignment film, the liquid crystal alignment pattern comprising bumps that are formed on one or more nonplanar surfaces and have a dimension that provides liquid crystal alignment,
  wherein the one or more nonplanar surfaces have a shape of a lenticular lens array that extends in one direction.

9. The alignment film of claim 8, wherein the lenticular lens array is configured of a convex lens shape, a concave lens shape, or a Fresnel lens shape.

10. The alignment film of claim 8, wherein a width of each of the bumps is 0.05 μM to 10 μM.

11. The alignment film of claim 8, wherein a pitch of each of the bumps is 0.05 μM to 20 μM.

12. The alignment film of claim 8, wherein a height of each of the bumps is 0.01 μM to 5 μM.

13. The alignment film of claim 8, wherein the bumps has a linear shape in which an angle formed by the extension direction of the shape of the lenticular lens array and an extension direction of the linear shape of the bumps is 0° to 90°.

14. A method of manufacturing an alignment film for a liquid crystal (LC) lens, the method comprising:
  forming a pattern comprising bumps having a dimension that provides liquid crystal alignment on a layer to be imprinted on a planar surface; and
  forming a surface of the layer to be imprinted on which the pattern is formed, as one or more nonplanar surface, wherein the one or more nonplanar surfaces have a shape of a lenticular lens array that extends in one direction.

15. The method of claim 14, further comprising, before the forming of the surface of the layer to be imprinted on which the pattern is formed, as the one or more nonplanar surface, forming a support layer on the pattern.

16. The method of claim 15, further comprising, after the forming of the surface of the layer to be imprinted on which the pattern is formed, as the nonplanar surface, removing the support layer.

17. A method of manufacturing an alignment film for a liquid crystal (LC) lens, the method comprising patterning the replicated pattern of the mold of claim 1 onto an object to be imprinted.

18. A method of manufacturing a mold, comprising:
forming a pattern comprising bumps having a dimension that provides liquid crystal alignment on a layer to be imprinted on a planar surface;
forming a surface of the layer to be imprinted on which the pattern is formed, as one or more nonplanar surface; and
patterning a shape of the nonplanar surface onto an object to be imprinted,
wherein the one or more nonplanar surfaces have a shape of a lenticular lens array that extends in one direction.

19. A method of manufacturing a liquid crystal (LC) film comprising forming a liquid crystal (LC) layer by injecting liquid crystal (LC) materials into the one or more nonplanar surface of the alignment film of claim 8.

20. The method of claim 19, further comprising, forming an alignment layer on the liquid crystal (LC) layer.

21. The method of claim 20, wherein the alignment layer is formed by a fine linear pattern alignment process, an optical alignment process, or a rubbing alignment process.

22. The method of claim 20, wherein the alignment layer provides liquid crystal alignment, and an alignment direction of the alignment layer corresponds to an alignment direction of the bumps of the liquid crystal (LC) layer disposed below the alignment layer.

* * * * *